United States Patent
McCutchen et al.

(10) Patent No.: US 10,440,329 B2
(45) Date of Patent: Oct. 8, 2019

(54) HYBRID MEDIA VIEWING APPLICATION INCLUDING A REGION OF INTEREST WITHIN A WIDE FIELD OF VIEW

(75) Inventors: David McCutchen, Portland, OR (US); Benjamen Siroshton, Estacada, OR (US); Benjamin Humphrey, Frisco, TX (US); James Exner, Plano, TX (US); Casey McCandless, McKinney, TX (US)

(73) Assignee: Immersive Media Company, Tumwater, WA (US)

( * ) Notice: Subject to any disclaimer, the term of this patent is extended or adjusted under 35 U.S.C. 154(b) by 1183 days.

(21) Appl. No.: 12/786,270

(22) Filed: May 24, 2010

(65) Prior Publication Data
US 2010/0299630 A1 Nov. 25, 2010

Related U.S. Application Data

(60) Provisional application No. 61/180,819, filed on May 22, 2009.

(51) Int. Cl.
| | | |
|---|---|---|
| G06F 16/783 | (2019.01) | |
| H04N 7/18 | (2006.01) | |
| H04N 5/232 | (2006.01) | |

(52) U.S. Cl.
CPC .......... *H04N 7/18* (2013.01); *G06F 16/7837* (2019.01); *G06F 16/7844* (2019.01); *G06F 16/7847* (2019.01); *H04N 5/23238* (2013.01)

(58) Field of Classification Search
CPC ......... G06F 17/30781; G06F 17/30784; G06F 16/7847; G06F 16/7837; G06F 16/7844

USPC .......................................................... 709/226
See application file for complete search history.

(56) References Cited

U.S. PATENT DOCUMENTS

| | | | | |
|---|---|---|---|---|
| 7,624,337 B2* | 11/2009 | Sull | .............. | G06T 3/4092 715/201 |
| 8,086,750 B2* | 12/2011 | Voegel | .............. | H04N 21/222 709/231 |
| 8,169,916 B1* | 5/2012 | Pai | .............. | H04N 21/2181 370/236 |
| 2002/0069218 A1* | 6/2002 | Sull | .............. | G06T 3/4092 715/202 |
| 2007/0005795 A1* | 1/2007 | Gonzalez | .............. | G11B 27/10 709/232 |
| 2008/0235566 A1* | 9/2008 | Carlson | .............. | H04N 21/23439 715/205 |
| 2010/0042682 A1* | 2/2010 | Kaye | .............. | G11B 27/034 709/203 |
| 2010/0274820 A1* | 10/2010 | O'Brien | .............. | G11B 27/034 707/805 |
| 2015/0135206 A1* | 5/2015 | Reisman | .............. | H04N 21/26283 725/18 |

* cited by examiner

*Primary Examiner* — Asghar H Bilgrami
(74) *Attorney, Agent, or Firm* — Chernoff, Vilhauer, McClung & Stenzel, LLP

(57) ABSTRACT

A content delivery and display solution includes a viewing application for displaying immersive images with a region of interest, in addition to conventional fixed-aspect-ratio media. The display can include the layered display of metadata, multiple windows, and images or hotspots embedded into the immersive image. The viewing application can be used for the display of either live or prerecorded images, from local or online sources.

22 Claims, 16 Drawing Sheets

HMD

Online Video Browser

Extraction and Frame Capture

City Browser

Fig. 15    Augmentation

Overlay

View Track

Worldview

156

158

Joystick

2360 Live Streaming Topology

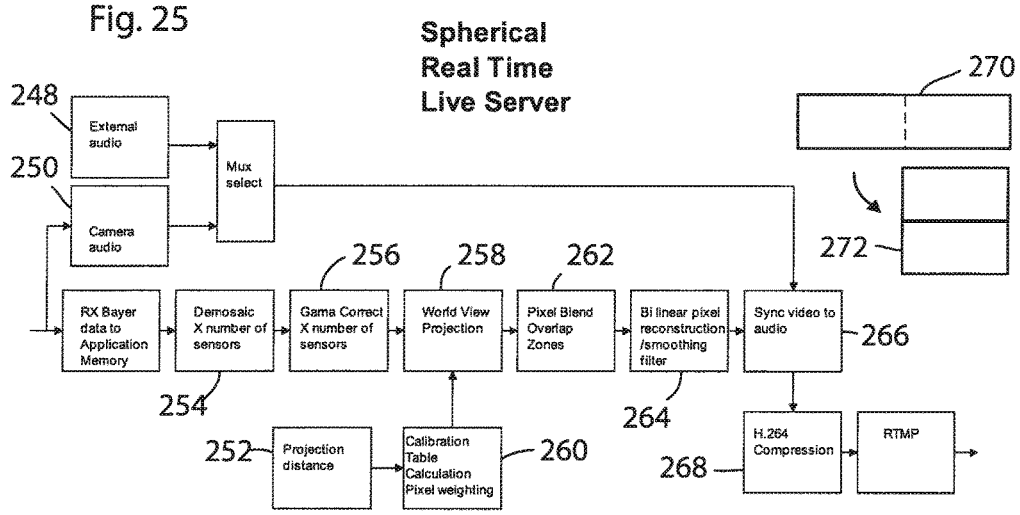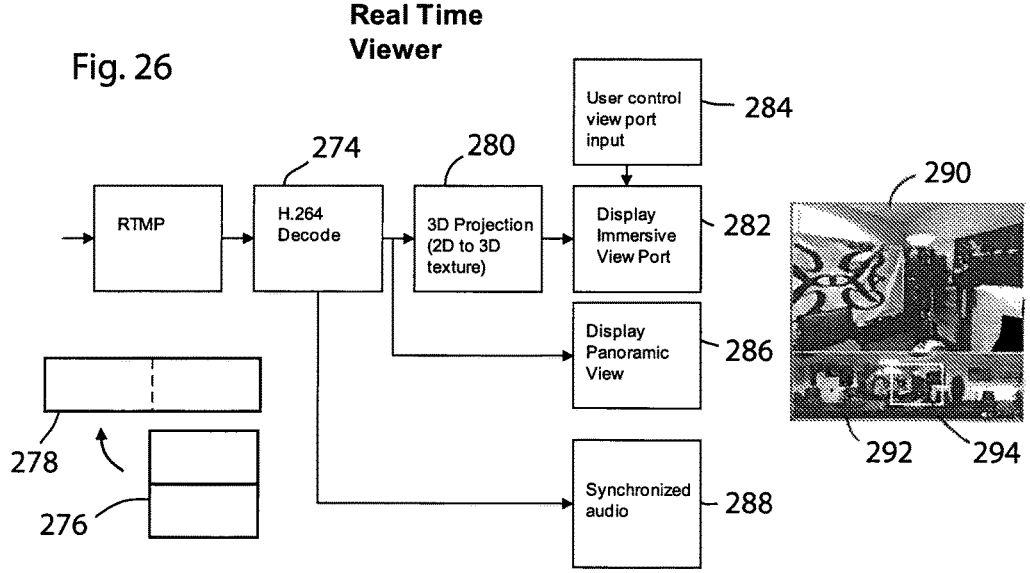

HYBRID MEDIA VIEWING APPLICATION INCLUDING A REGION OF INTEREST WITHIN A WIDE FIELD OF VIEW

CROSS REFERENCE TO RELATED PATENT APPLICATION

This application claims the benefit of U.S. Provisional App. No. 61/180,819, filed on May 22, 2009, the disclosure of which is incorporated herein by reference in its entirety.

BACKGROUND

Technical Field

This disclosure generally relates to a panoramic image reproduction system comprising an image server and a software application on a computing platform which allows for fuller appreciation of the inherent possibilities of wide field of view images. It has a relation to geographical information systems, and specifically to presentation processing of a document wherein the manner of spatially locating some type of annotation is specified.

Description of the Prior Art

Digital media have typically been delivered as separate files which are then decoded and displayed through viewing application software. Most media viewing applications are intended to display the full frame of the media file. In other words, if a movie or still image is recorded as a frame with a given aspect ratio and number of pixels, then this is the image that is displayed. Zooming features in the viewing application then can display a given portion of the image.

In immersive imaging, the image is typically too wide to be seen all at once, because it would appear distorted and includes an excess of detail, so a movable closeup region of interest (ROI) is usually extracted from within the larger immersive image which remains unseen. This approach is typically used in immersive still photography, and more recently, in immersive video imaging. The immersive image can be generated by immersive photography, or by immersive computer graphics rendering, or any combination of the two.

Recently, image and sound files have had metadata included, which gives further information about the media, and its relationship to other information. This leads to more complex media objects, which depend on media viewing applications to decode and interpret them. Recent media standards such as HTML5, MPEG 4 (H.264), MPEG-7, and MPEG-21 include many descriptions of complex media objects. However, these have not yet included the ROI navigation requirement of an immersive viewing application in combination with the fixed playback characteristics of conventional media.

What has been needed is a media viewing application that enables the ROI behavior of immersive imaging in a convenient form for the user, together with the ability to display metadata and other data and image types in a common display platform.

SUMMARY

A system for the display of media and associated metadata features media and metadata servers delivering data to a viewing application for displaying immersive images with a movable region of interest, in addition to conventional fixed-aspect-ratio media. The viewing application display includes an indication of whether or not a visual image represents a movable region of interest within an immersive image. The viewing application also has plug-in extension services for a variety of displays, including listings of available media, the layered display of metadata, multiple windows, images or hotspots embedded into the immersive image, maps, graphics, spatial analysis of visual information, and spatially located annotations. Other extension services of the viewing application include improved means for the movement and use of the region of interest window, including a head-mounted display tracker, the ability to record a view track or select from prerecorded view tracks, and the ability to copy and store the displayed region of interest and associated metadata. The viewing application can be used for the display of either live or prerecorded images, including live immersive video streams, from local or online sources. As an option for immersive images, a reduced worldview image of all or most of the spherical image can also be displayed to give a sense of the location of the region of interest window.

BRIEF DESCRIPTION OF THE DRAWINGS

FIG. 25 is a block diagram of the real time immersive server application.

FIG. 26 is a block diagram of the real time immersive client application.

DETAILED DESCRIPTION

Figure 1:
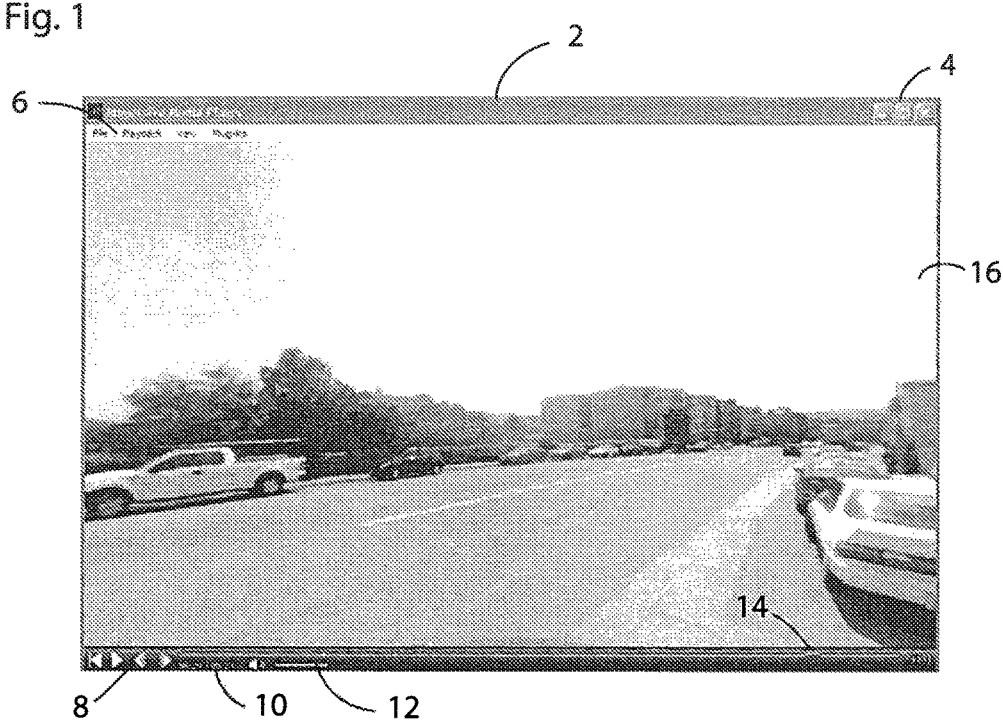
FIG. 1 is a screen shot of the viewing application.

Immersive imaging, which can be defined as the relating to the presentation of an exceptionally wide field of view, presents its own new field of possibilities. The term immersive imaging as used here includes both spherical imaging and panoramic imaging, which typically is in the form of a cylindrical strip, as well as other wide field of view images which do not extend 360 degrees, but which approach or exceed the field of view of human vision.

Such immersive imaging systems, and related applications, are known in the art, as illustrated by the applicant's articles "A Dodecahedral Approach to Immersive Imaging and Display," ACM SIGGRAPH Computer Graphics, Vol. 31, No. 2, pp. 35-37, May 1997; "MPEG 3DAV—Video-Based Rendering for Interactive TV Applications, "Proc. of 10th Dortmunder Fernsehseminar, Dortmund, Germany, September 2003; and "3DAV Exploration of Video-Based Rendering Technology in MPEG," IEEE Trans. Circuits and Systems for Video Technology, March 2004, Vol. 14, No. 3, pp. 348-356, and by the applicant's prior patent publications U.S. Pat. Nos. 5,023,725, 5,703,604, 6,141,034, 6,317,166, 7129,971, and 7,525,567 and 20100050221. Such systems and applications are also discussed in patents and patent publications to third parties, including U.S. Pat. Nos. 6,320, 584, 6,323,858, 6,337,683, 6,690,374, 6,731,305, 6,738,073, 20020021353, 20020089587, 20030197785, 20040075738, and 20040257384.

In the discussion that follows, terms such as "immersive imaging system" are used to refer to such arrangements. No particular limitation should be inferred from these terms; they are used as general descriptors. The terms "player" and "viewer" will both be used to describe the viewing application. The term "video" refers to digital motion pictures of any frame rate, encoding or size, especially those which assume a fixed frame for presentation relative to the underlying image.

An embodiment of the invention is a playback platform for a variety of media types, including immersive imaging. The source media can be delivered via local resources such as a hard or solid state disk storage, through streaming such as using protocols such as http, https, mms and rtsp, or some combination of the two. The interactions can follow a scripting protocol such as Javascript, which is a widely compatible standard for web interactivity.

The immersive images used can be in the form of still images or motion picture sequences. The still images can be in uncompressed formats such as BMP, compressed formats such as PNG or JPEG, or high dynamic range formats such as OpenEXR. The motion picture sequences can be strings of stills in any still image format, or motion picture formats which typically use a codec and store the result in a wrapper such as an AVI, WMV, MPG or FLV file.

The viewing application includes a viewing application display featuring a user interface for generating data requests, a data management service for receiving data from the servers, including identification information, and for storing the received data in the memory of the computer host, a data formatting service for identifying a source formatting of the received data and for formatting the received data, and one or more view windows for the display of media content, and an optional graphical user interface (GUI) that presents the user with options for the control of the behavior of the playback process. There is typically a splash screen on startup and some display of branding information, either as an overlay on the displayed image or an inset into a frame surrounding the view window. The viewing application also includes stream and buffer management for the reliable importation of the media in preparation for display. The features and behaviors of the viewing application will be described here as the components of a GUI, but it will be appreciated by those skilled in the art that other means could be used to activate these features, such as keyboard commands or automatic activation based on past user choices.

The basic layout of this GUI is shown in FIG. 1. The GUI can be minimized or made invisible by the choice of an optional full-screen mode for the view window. The GUI includes a frame 2 which can be part of a browser window or a standalone window with the usual window controls of the operating system 4. The GUI can include a menu 6, playback controls 8, time and other metadata displays 10, sound controls 12, a seek bar 14 and the displayed image 16.

With the playback controls 8 and 10, the playback of a motion picture can be picked up and stopped at any point, according to the time or frame number. The playback can be done straight through, looped, paused, rewound, wound forward to a given point, and played at regular, slow or fast motion speeds. A seek bar 14 is used to quickly move to a given point in the media file. Optional metadata display 10 of information about the media being played can include the current time, media duration, and name of the file or subject.

Figure 2:
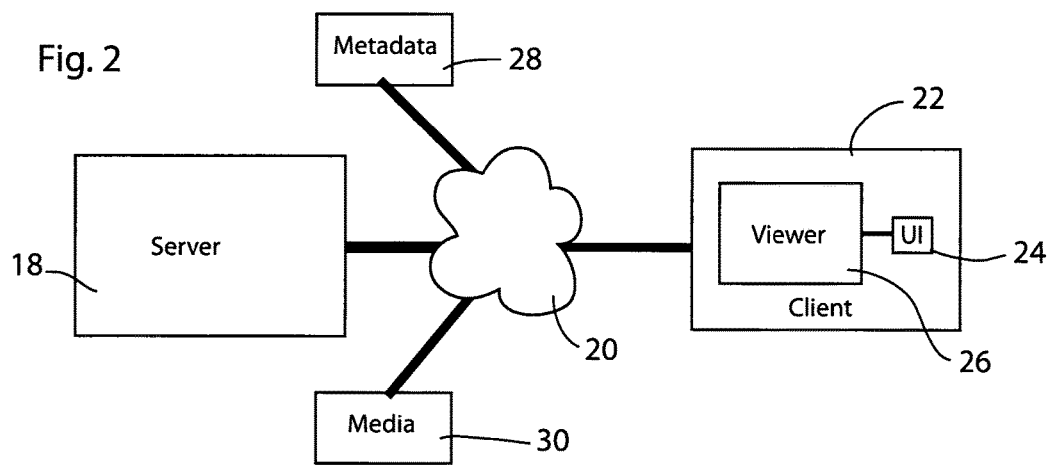
FIG. 2 shows a block diagram of the basic layout of the components feeding the viewing application.

FIG. 2 shows a block diagram of the basic layout of the components feeding the viewing application, including an image server 18 connecting through a network 20 to a client comprising a storage medium (or having operational access to a machine-readable storage medium) for the storage of machine-readable instructions for a computer processing at dorm 21. The storage medium may be any suitable type, for example, magnetic storage, optical storage, quantum storage, phase change storage and the like. The computer pressing platform 21 contains a client viewing application 22 that includes a user interface 24 and a display 26. Other data can also be fed into the client viewing application 22 from servers containing metadata 28 or other media such as sound or image data 30. All of these servers represent storage for storing data, any subdivisions associated with the data, and identification information for the data and its associated subdivisions, such as names, times, and frame numbers and essence for sound, image or other media files, and tags, descriptions parsing methods and other data for metadata, and for delivering this data upon a request from a client according to its identification information.

Figure 3:
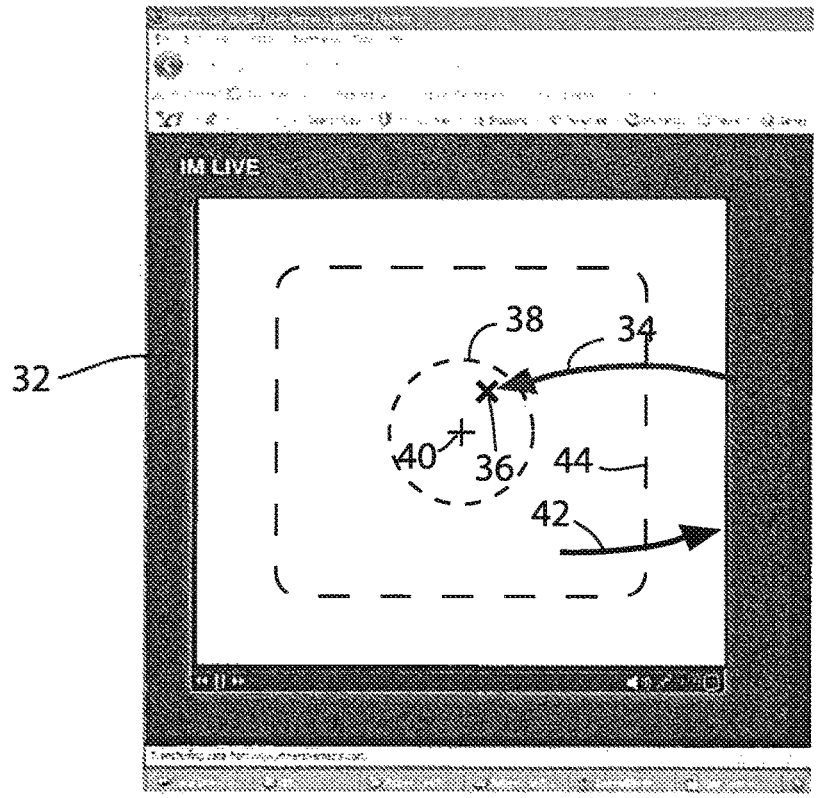
FIG. 3 shows how ROI navigation can be done with a cursor but without clicking and dragging.

The navigation features for immersive imaging in particular includes the control of a ROI. The directional movement of the ROI can be done with a click and drag using the left button of a mouse or other pointing device, or based on the position of the cursor within the view window. For example, as shown in FIG. 3, navigation can be done with a cursor but without clicking and dragging. If the viewing application display is part of a more complex display, such as a browser window 32, the cursor, such as from a mouse or other pointing device, can enter the viewing application display window, such as along the path 34, no ROI control happens within the viewing application display window until the cursor 36 reaches a zone near the center of the viewing application display window, as shown by the activation zone boundary 38. At that point, the directional movement of the ROI begins, with a speed and direction according to a vector set by the distance of the cursor 36 from the center of the viewing application display window 40. From then on, the movement of the ROI is tied to the cursor, until the cursor is brought out 42 of the viewing application display window, at which point the directional control is released when the deactivation boundary 44 is crossed. To prevent abrupt changes of ROI movement, the boundaries shown here should be understood as the centers of transition regions, where the amount of control is gradually ramped up or ramped down. There can be an indication of the direction and rate of the movement of the ROI within the immersive image by a modification of the appearance of the cursor. Other pointing devices such as a joystick, trackball, or air mouse can be used for directional control of the ROI. In additional, there can be a zoom control which changes the field of view of the extracted ROI.

Figure 4:
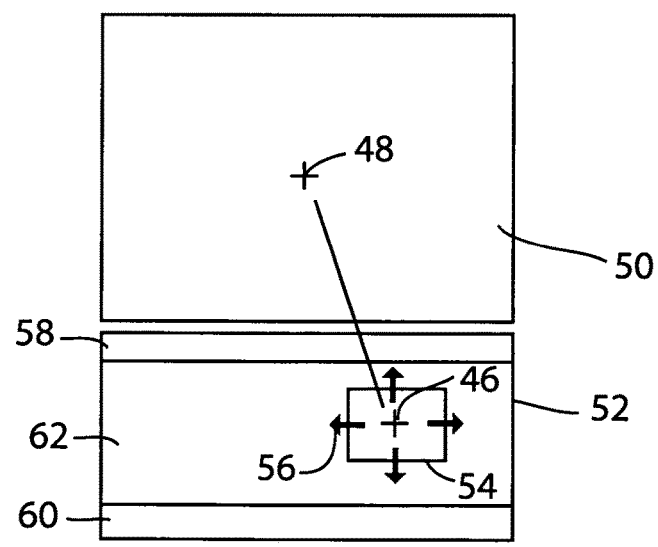
FIG. 4 shows a dual display of a ROI and an immersive image.

Preferably, there should be some indication to the user of the larger immersive image that is available. This can take several foil is, including a display of the source immersive image in a smaller size along with the ROI image. The relationship between the ROI and the immersive image can be shown in several ways. One way shown in FIG. 4 is by a dual display where a movable crosshair 46 indicates the center 48 of the ROI 50 on the immersive image 52. Moving the ROI changes the location of the crosshair on the immersive image, and clicking on a location on the immersive image changes the crosshair and the corresponding center of the ROI, to that location. Another way is to show an indication of the corners or boundaries 54 of the ROI on the immersive image; these can change accordingly as the zoom 56 for the ROI changes. The indication of the borders of the ROI can also be shown by a change of image tone, such as by darkening or desaturating the color of the portions of the immersive image that are not being displayed in the ROI. Instead of having the indicators slide over an immersive image in its original form as delivered to the viewing application, the immersive image can be changed too, if the processing power of the host computer system allows. For instance, as the ROI moves to look around the horizon of a spherical image, the immersive display can change so as to maintain the ROI in the center of the displayed immersive image. The ROI boundaries are here shown on the immersive image as rectangular, for the sake of simplicity, even though they would actually change in shape due to the distortions in the flat immersive image projection. A spherical immersive image in an equirectangular format typically shows radical distortion at the top which complicates the way ROI borders are displayed, so to make the displayed immersive image more manageable, the top 58 and bottom 60 areas of a full sphere image can be trimmed off to make a panoramic strip 62.

Trimming the image to preserve bandwidth and simplify the display is the approach used in live immersive streaming, as described below. In this iteration of the viewing application, it appears as a display control embedded in a browser interface, as shown in FIGS. 15-22.

Figure 5:
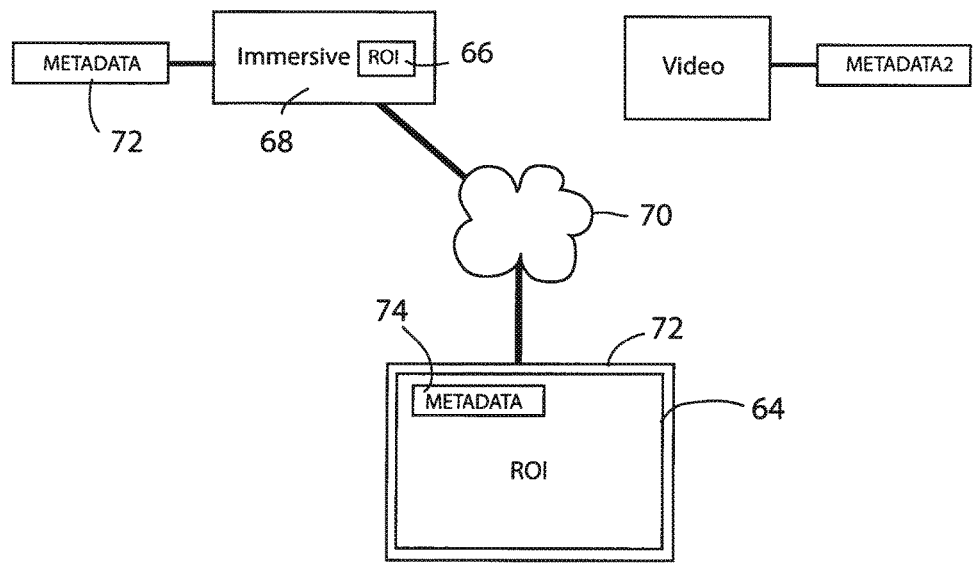
FIG. 5 shows the delivery and display of a ROI from immersive video and metadata in the viewing application.

The viewing application is capable of displaying immersive and non-immersive images, as well as other components. As shown in FIG. 5, the display of the viewing application 64 shows a ROI 66 within the immersive image 68. This ROI can be generated from the source immersive image 68 by the server, according to instructions from the client viewing application, or the immersive image can be delivered to the client application and the ROI extracted locally. In both cases, the data and communications are delivered through a network connection 70. Metadata 72 associated with the immersive image or the ROI, for example geographic data or hotspots, can also be delivered and be a metadata component 74 the display of the viewing application 64.

Figure 6:
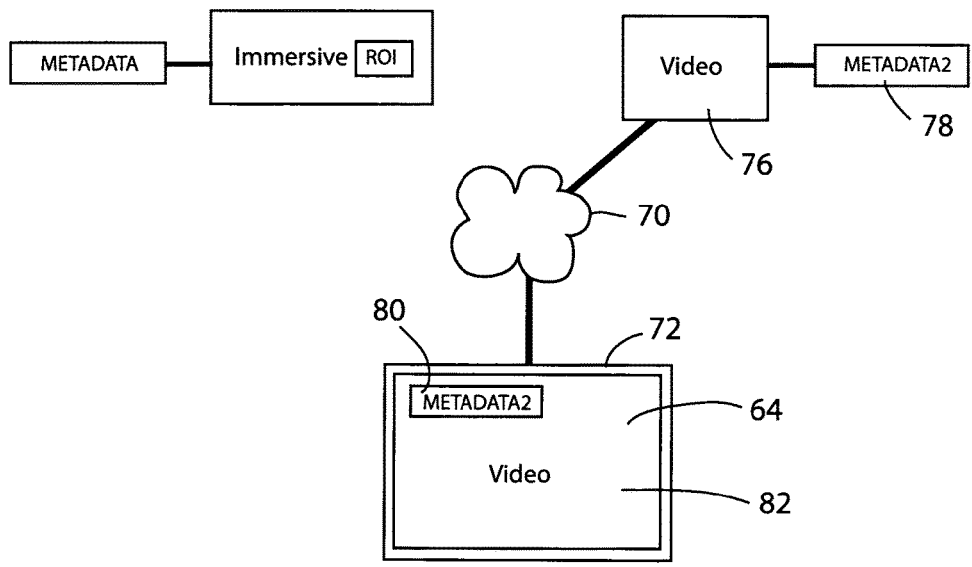
FIG. 6 shows the delivery and display of conventional video and metadata in the viewing application.

In FIG. 6, non-immersive video, not meant to be seen through a ROI, is delivered by a video image server 76, here with an associated stream of metadata 78, and both are delivered through the network connection 70 to be part of the display of the viewing application 64, including a conventional video metadata component 80.

Figure 7:
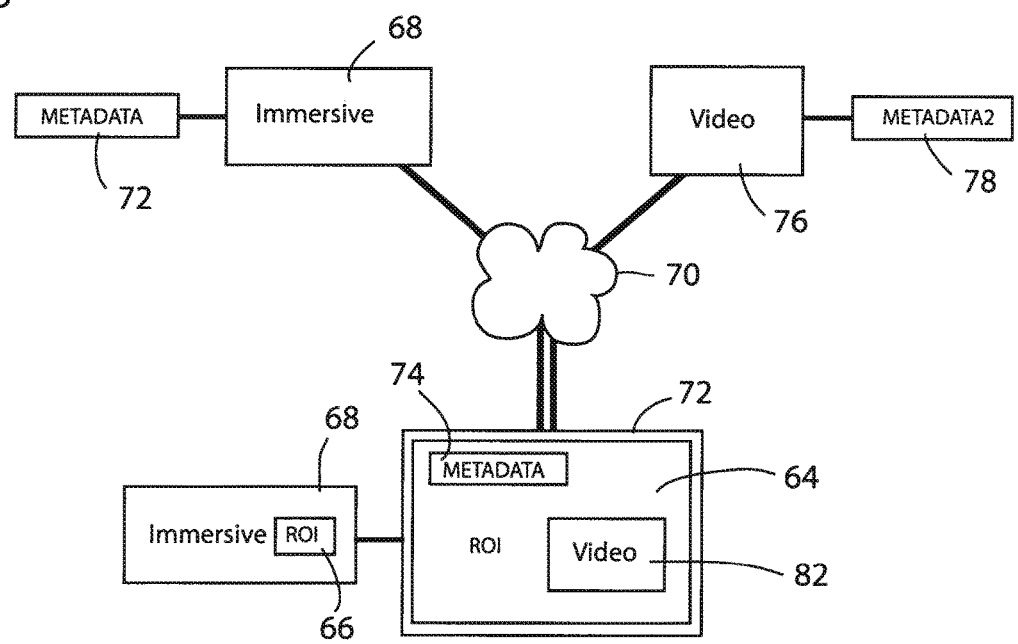
FIG. 7 shows the delivery and display of a conventional video overlay in combination with a ROI from immersive video and metadata in the viewing application.

As shown in FIG. 7, a video image that is also available to the viewing application can be a video overlay 82 on the display in the viewing application 64 of the immersive image ROI 66, which in this example is extracted locally by the client from the delivery and local storage of the source immersive image 68. This video overlay 82 can be caused by a user action, such as triggering a hotspot, successfully following a character's motion by tracking with a ROI, or solving a puzzle in a game. This video 76 can be a standard two-dimensional, non spherical video image. This video overlay 82 has a variable relationship to the background immersive image 68. For example, it can be fixed to a position within the ROI display, such as in one corner, or it can be tied to a particular portion of the spherical field of view of the immersive image, and move in and out of the display 64 as the ROI moves across the sphere. The video overlay window can be sizable (i.e, adjustable size), and can include a close button, or it can close automatically when the end of the video is reached.

This type of video image can also occupy the display of the viewing application all by itself, as in FIG. 6. In this case, the viewing application displays the video media in the manner of a conventional viewing application. However, this viewing application is also capable of transitioning from media with a fixed viewpoint, such as conventional video, to a media with a movable viewpoint movable viewpoint, such as an immersive image, if the source media allows for it. For example, the immersive image can become available after the playback of the conventional video image is done. This transition from a fixed to a movable point of view can be signaled by a visual cue in the viewing application, such as a change in the frame or appearance of the viewing application window. One example of this is a change in the shape of the viewing application window, such as from a rectangle with straight sides to one with concave or convex sides.

Figure 8:
FIG. 8 shows the use of rounded corners on the viewing application window to indicate a navigable ROI is available.

FIG. 8 shows an indication by means of rounded corners 84 on the viewing application window to indicate a navigable ROI is available.

Figure 9:
FIG. 9 shows the use of inwardly-rounded sides on the viewing application window to indicate a navigable ROI is available.

In FIG. 9 the indication is inwardly-rounded sides 86. Another example is the addition of navigation cues such as arrows to the sides or corners of a viewing application window frame when immersive content with a movable ROI is being displayed.

The viewing application can be part of a network environment such as a browser window or a standalone application. The underlying framework can be a general standard such as Qt (a cross-platform application and UI software framework, available from Nokia Corporation), or a more browser-specific standard. The ActiveX version of the viewing application implements the viewing application Core embedded within an ActiveX shell, while the .NET product implements the viewing application Core embedded within a .NET wrapper. The XPCom product implements the viewing application Core embedded within an XPCom shell, which is primarily used for Mozilla FireFox plug ins.

Figure 10:
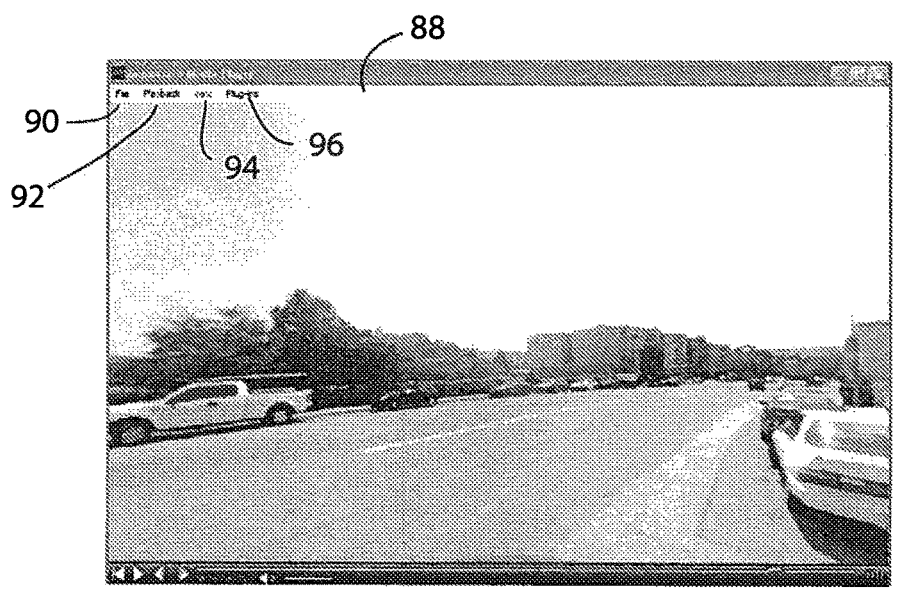
FIG. 10 shows a version of the Standalone viewing application, with a wide aspect ratio for the display.

FIG. 10 shows a version of the Standalone viewing application, with a wider aspect ratio for the display and different playback controls than FIG. 9. The Standalone viewing application implements the viewing application's Core components within a standard window shell, with the ability to be extended through the use of plug ins. In the Standalone application, the window shell includes the standard underlying look and feel of the operating system used, such as a Windows, Linux or Mac OS, with dockable windows around the core viewing application view window. The subsystem for the rendering of the displayed images can be according to DirectX or OpenGL, or any method of automatically drawing upon hardware graphics resources to improve the image quality.

The window shell can includes a Menu 88 with selectable components. These Menu components commonly include headings and subheadings. Example Menu headings are FILE 90, PLAYBACK 92, VIEW 94, and PLUG INS 96.

The subheadings for FILE 90 can include items such as "Open Media," which displays a standard open file dialog to choose a file; "Open Url" displays a custom GUI input containing an editable dropdown to type or paste in a url to open, or the url can be selected from a dropdown list of the last opened url's, with a number based on Preferences. "Preferences" is a custom GUI that displays 'page' images down the left side; selecting an image displays the page contents on the right side. Some examples of pages are ones for the Viewing Application, Video, and View Windows. The Viewing Application page includes preferences for setting a Maximum Count for the Url History, and a Mouse Motion Velocity Scale. The Video page contains properties that affect video playback, including a Video Playback radio box with selectable buttons to activate or inactivate Auto Detect, Software rendering, or VMR9 Hardware rendering. OK saves the Preferences, and Cancel closes the GUI without saving. Also under this heading are "Recent Files" which displays, for example, the last four opened files, "Help" contains the Immersive viewing application "Help" file, which can be accessed either locally or online, and "About" which has legal, version and copyright information about the Immersive viewing application, and a list of all found plug ins with their corresponding version numbers. "Exit" exits the application.

The PLAYBACK 92 heading has choices for Toggling Play/Pause by hitting the Space bar, and an Auto Loop feature to automatically repeat the playback.

Under the VIEW 94 heading can include "New View Window", "Choose Window", and "Message Log". "New View Window" opens a new view window in addition to the current one. The new window is a standard window with the viewing application core abilities embedded, and a toolbar at the top of the window to allow linking or unlinking to the main window view with a given offset angle, in terms of yaw, pitch and roll, and a menu bar. The menu bar of the new window includes options for activating plug-ins for that window, or special display characteristics, such as assignment to another monitor display channel, or a This new view window can be given its own aspect ratio, either manually or by resizing controls, and be defined as another ROI, offset from the current one, within the source immersive image. For example, multiple ROI windows can be displayed simultaneously as the adjoining facets of an overall view within an immersive source image, such as the multiple linked cube faces of a Cave Automatic Virtual Environment (CAVE) immersive display. If these multiple windows are to be shown through different projectors, they should be given different monitor output channels in the application. "Choose Window" chooses among the available windows or data displays, and "Message Log" displays text output messages generated from the core and plug ins.

The PLUG INS 96 heading contains a list of the available plug ins, which are extensions that add services to the application, with the ability to activate or inactivate them. Some examples of these plug in service are ones for a Head-Mounted Display (HMD), Online Video Browser, Extraction, Frame Capture, City Browser, Augmentation, Overlay, View Track, Worldview, Remote Control, and a Joystick plug in service, which are all described below. These plug ins represent an unlimited number of options that can expand the capabilities of the viewing application, and allow for the development and delivery of enhancements by either Immersive Media Company or third parties.

The Core components for the viewing application could be embodied in a Software Development Kit (SDK), including special Immersive Media Company (IMC) versions of the Core components for the viewing application such as InitViewer, OpenMovie, GetStreamBandwidth, GetMovieSource, GetDownloadPercent, GetBufferingPercent, Play, Pause, SetMovieTime, GetMovieTime, GetMovieDuration, GetMovieTimePerFrame, SetZoomFieldOfView, GetZoomFieldOfView, SetViewYaw, GetViewYaw, SetViewPitch, GetViewPitch, SetViewRoll, GetViewRoll, SetViewAngles, GetMoviePlayState, SetGUIElementVisibility, GetGUIElementVisibility, SetVolume, GetVolume, SetMute, GetMute, SetControlElementEnable, GetControlElementEnable, SetProperty, GetProperty, SetZoomFieldOfViewLimits, GetZoomFieldOfViewLimits, RegisterViewWindow, UnRegisterViewWindow, SetViewWindowOffsetAngles, GetViewWindowOffsetAngles, SetVideoFrameCallback, SetViewChangeCallback, SetMovieStateChangeCallback, SetOutputMessageCallback, SaveScreenshot, LoadPlugin, ReleasePlugin, and ReleaseViewer. In addition to these components, there are event-based commands such as OnViewChange, OnVideoFrame, OnMovieStateChange, and OnOutputMessage.

An example of the commands in a Scripting Engine using JavaScript for a "viewing application" object include loadMedia, getSourceUrl, setMediaTime, getMediaTime, pause, play, loadMediaOverlay. Example commands for a "net" object are openUrl, getWebRequest, and for a "console" object: writeToLog.

Some example plug ins described here are a Head-Mounted Display (HMD) plug in service, the Online Video Browser plug in service, Extraction, Frame Capture, City Browser, Augmentation, Overlay, View Track, Worldview, Remote Control, and a Joystick plug in service.

Figure 11:
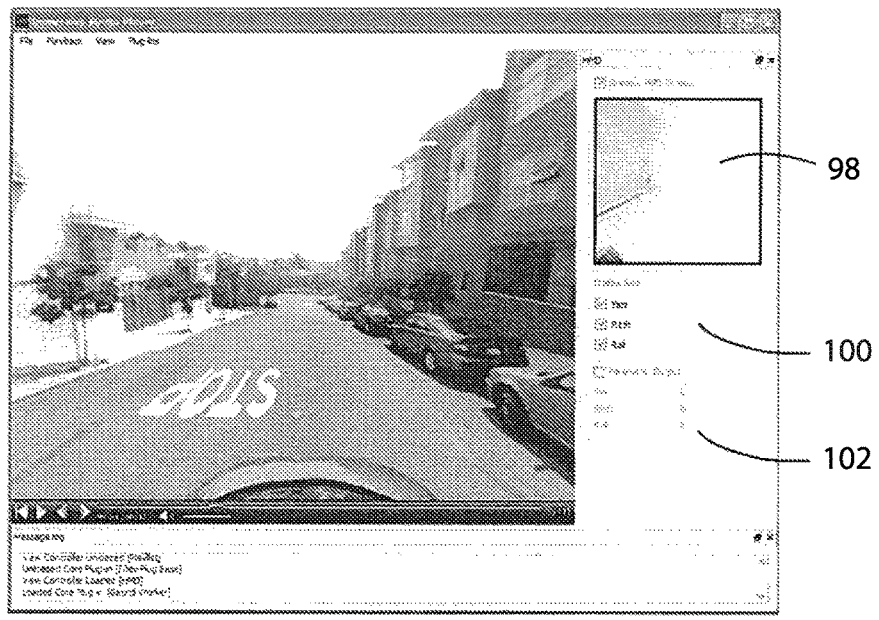
FIG. 11 shows an example user interface for the Head-Mounted Display (HMD) plug in service for the viewing application.

FIG. 11 shows the viewing application with the HMD plug in service. This plug in service provides support for Head Mounted Displays, such as the eMagin Z800 and Vuzix VR920. The plug in service involves generating an appropriately formatted output image to the HMD device, where the internal head-tracking device in the HMD is used to change the position of the ROI by the simple act of the user's turning their head. The plug in service also includes the ability to recenter the display on the sphere according to the current direction the HMD is currently facing. When the plug in service is activated, a standalone user interface (UI) can include a preview window 98 of what the HMD user is seeing, with a selection for enabling or disabling the window. In addition, the axes of motion 100 can be activated or deactivated, and the HMD tracking angles 102 can be displayed. The interface can be C and Javascript.

Figure 12:
FIG. 12 shows an example user interface for the Online Video Browser plug in service for the viewing application.

The Online Video Browser plug in service, as shown in FIG. 12, provides a UI 104 for browsing and loading listed media from local resources or online web services, such as conventional web video channels or Immersive Media Company's IM360 immersive web services. This plug in service includes the ability to set a performance level for downloads 106, retrieve a channel list 108, retrieve a video list for a given channel, download locally cached channel thumbnails 110, and download locally cached video thumbnails 112. The user interface for this plug in service displays the channels in a dropdown list, including their thumbnails, and a list of the video and thumbnails within each channel, with the ability to click the listing to load the media. The listing of the available channels and video can be controlled by the security settings for a given user determined at the time the user logs in.

Figure 13:
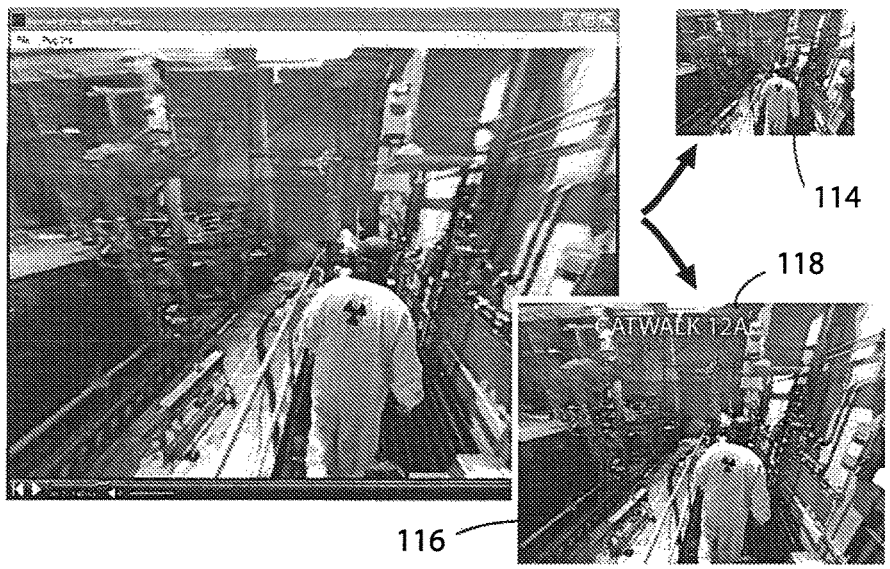
FIG. 13 shows an example user interface for the Extraction and Frame Capture plug ins for the viewing application.

The Extraction and Frame Capture plug ins are shown in FIG. 13. The Extraction plug in service provides the basic ability to extract and save perspective-correct textures from the viewing application's ROI view. The Extraction Gui (ImageGrabber) includes a four-corner quadrangle with movable corners, and a button to take a snapshot 114 that can be saved as a compressed or uncompressed image. The C Interface commands include SetPixelClickedCallback, SetImageCapturedCallback, SetImageSize, GetImageWidth, GetImageHeight, SetImageGrabberVisible, GetImageGrabberVisible, SetGrabberFrameColor, and GetGrabberFrameColor.

The Frame Capture plug in service provides functionality to extract videos and images 116 from immersive motion pictures based on the viewing angles chosen over time. Its basic functions are add angles, clear angles, status message, retrieve codec encoder list, start recording, stop recording, output form (e.g. .avi or mpg video or as individual numbered .jpg's), custom naming, and save skybox images (i.e. a set of connected facets from an immersive image). The Capture Angle for the ROI involves a setting for the x, y, z and FOV, as well as the time and the name of the source media. Additional metadata can also be part of the frame capture, such as an overlay 118 of metadata such as GPS information, or other overlays such as notations, logos, or graphics denoting points of interest within the images 116. There is both a Javascript and a C interface.

Figure 14:
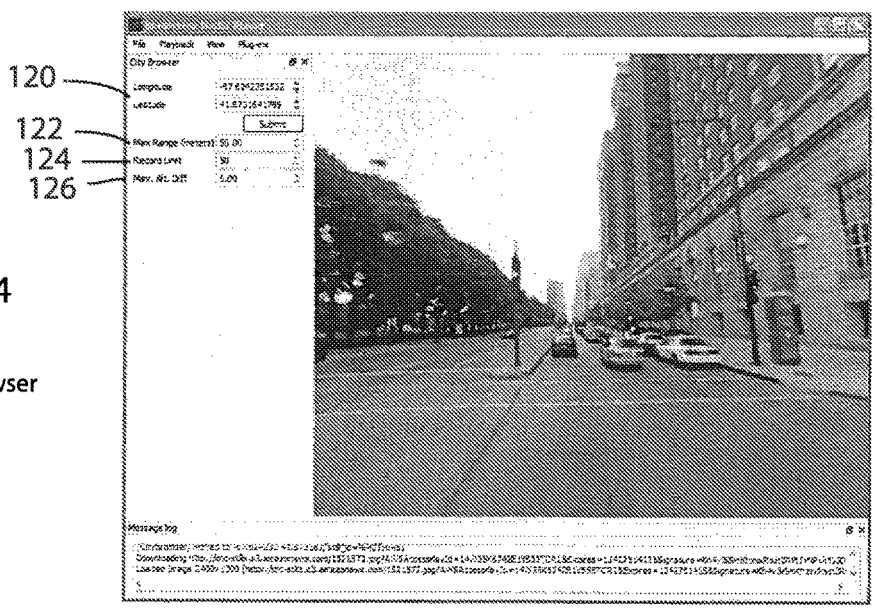
FIG. 14 shows an example user interface for the City Browser plug in service for the viewing application.

FIG. 14 shows a user interface for the City Browser plug in service. This plug in service enables browsing through a GPS-based database, such as a geolocated record of city streets, in regular or immersive video. The plug in service provides a readout and user-specified GPS location in longitude and latitude 120. The movement through the points of the GPS database is then set according to a maximum range of movement 122, a limit of how many locations are recorded 124, and a maximum deviation from interpolated locations that is allowed 126.

Figure 15:
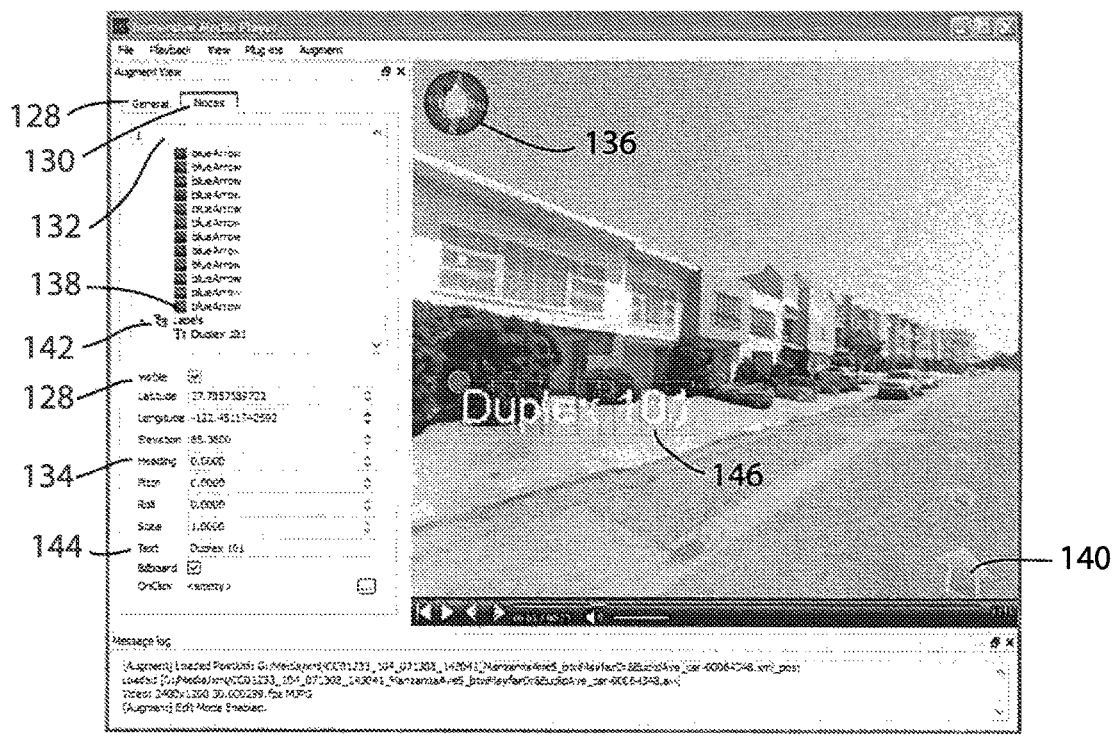
FIG. 15 shows an example user interface for the Augmentation plug in service for the viewing application.

The Augmentation plug in service shown in FIG. 15 provides the ability to place images, meshes and text into the viewing application's viewing experience, according to latitude and longitude coordinates. This plug in service also allows for geospatial data extraction, such as measuring distances within a scene, converting pixels to geospatial positions, and using that spatial information to reference other stored objects that share that location. As an example, in the viewing application display of a region of interest the user can click a pixel, which then casts a ray from the camera's center to that pixel, Then a comparison is made to find matching imagery in video frames, either stored locally or as a web resource, that are before and after the frame in which the pixel was clicked. The estimated locations are triangulated and then the locations of the pixel are locked back to the original ray. Then the application goes to a neighboring frame to look at the point that was marked, and if necessary the position can be adjusted, either manually or automatically, by adjusting its location along the originating ray. Once it is lined up then there is a high degree of visual accuracy of this marked point from surrounding frames. This basic approach can be extended to the recognition of outlines and objects to build a better three dimensional map of the environment.

The basic functions of the Augmentation plug in service involve augmentation objects arranged using a scene graph, spatial partitioning using a quad tree, a "steady cam" function to stabilize the image using visual analysis or direct measurement, such as with an Applanix POS LV system, to characterize the camera pose from frame to frame, a camera height offset, a post data frame offset, an edit mode, an auto load post XML option to import GPS and stabilization tracks recorded along with the video image, an ability to add post data manually, a display of lat/long coordinates, a display of an individual node, a secondary view with frame lock, a compass GUI overlay, and a measurement tool. The Augmentation Controller includes a General Tab 128 and a Nodes Tab 130. The General Tab 128 includes basic preferences and a Ground Offset Slider, a Frame Offset Slider, and a Edit Mode Checkbox. The Nodes Tab 130 displays a Tree View of Nodes, with a Property View for a Selected Node 132. The basic Scene Node Properties 134 are yaw, pitch, roll, altitude, longitude, latitude, and scale which can be displayed with a general compass and location indicator 136. These can be used to manually or automatically specify the placement of object in the scene, such as the blue arrow objects listed at 138 and shown at 140. Extended Scene Nodes such as 142 also have added mesh, image and/or text, such as the billboard text "Duplex 101" 144 which is displayed at 146. A Move Tool provides X, Y, Z lines to grab and drag. A Measure Tool is a gadget with two movable points to form a line, and the measurement displayed above the line's center point, in measurement units selectable on the General tab. A Secondary View tab a provides a 'hold frame' button to lock the current frame to this view. In addition to the basic C interface, a JavaScript interface for an "augment" object includes getLongitude, getLatitude, addText, addImage, addModel, and removeNode.

Figure 16:
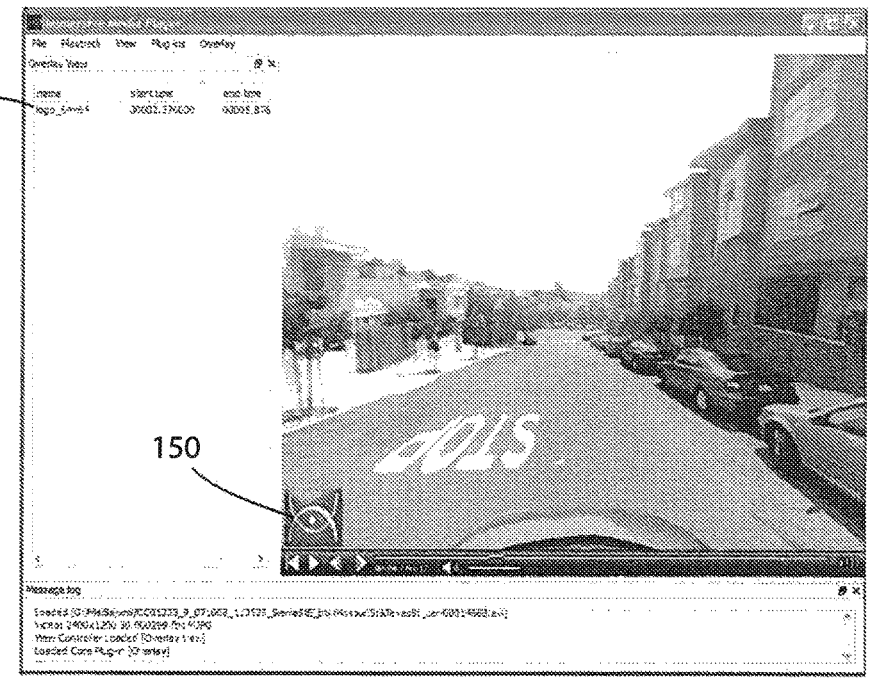
FIG. 16 shows an example user interface for the Overlay plug in service for the viewing application.

FIG. 16 shows the Overlay plug in service, which provides the ability to place images and text on top of the video based on frame time. The overlays will appear between a start and end time and will appear based on their formatting parameters. This plug in service allows for the basic augmentation of media based on time alone and without geospatial data. The basic functions are display overlay on top of loaded media, place overlay either sticking to a given view angle or aligned to screen edges, and set global fade in and out time. An Overlay Base Node 148 for the overlaid object 150 includes settings for the start time, end time, fade in (boolean), fade out (boolean), value, onClick script, enabled/disabled. Extended Scene Nodes include images, video and/or text. In addition to the basic C interface, there is a JavaScript interface for an "overlay" object.

Figure 17:
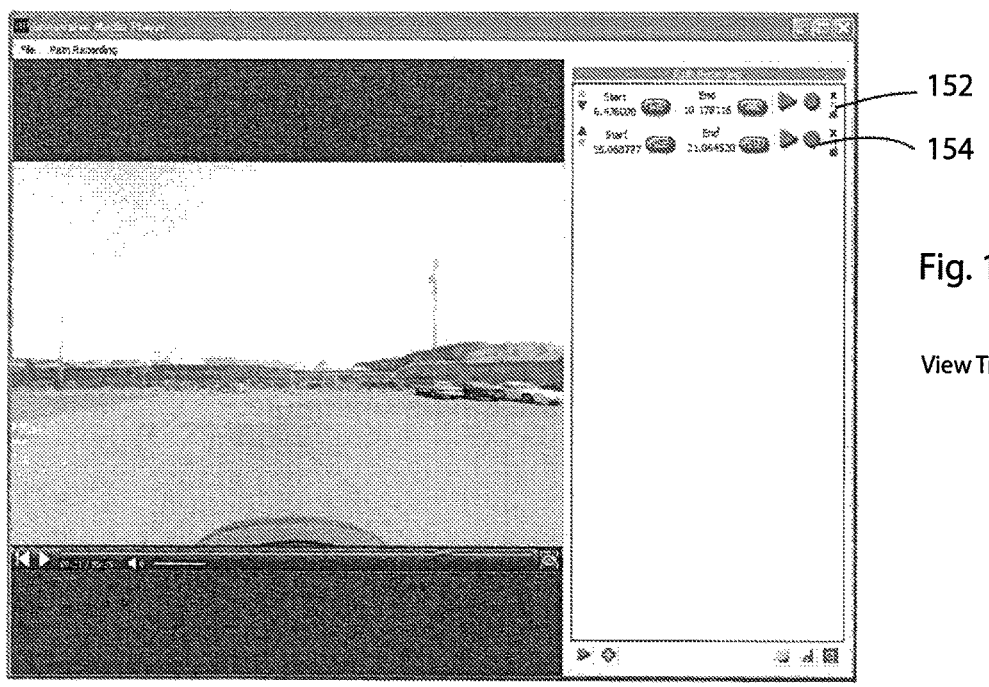
FIG. 17 shows an example user interface for the View Track plug in service for the viewing application.

The View Track plug in service shown in FIG. 17 provides the ability to record and play back the paths taken by a ROI under manual control within an immersive scene, using the viewing angles, field of view and time. Here two independent view tracks are shown at 152 and 154. The basic functions are: Manage View Tracks, play all Tracks, play single Track, record Track, stop playing/recording, get status text. Manage View Tracks functions include reading View Track angles (including x, y, x and fov), start time, end time, get duration, at least a 'TimesValid' check method, Add Angle, Set Angle, and get AngleCount. There is a C and a JavaScript interface.

Figure 18:
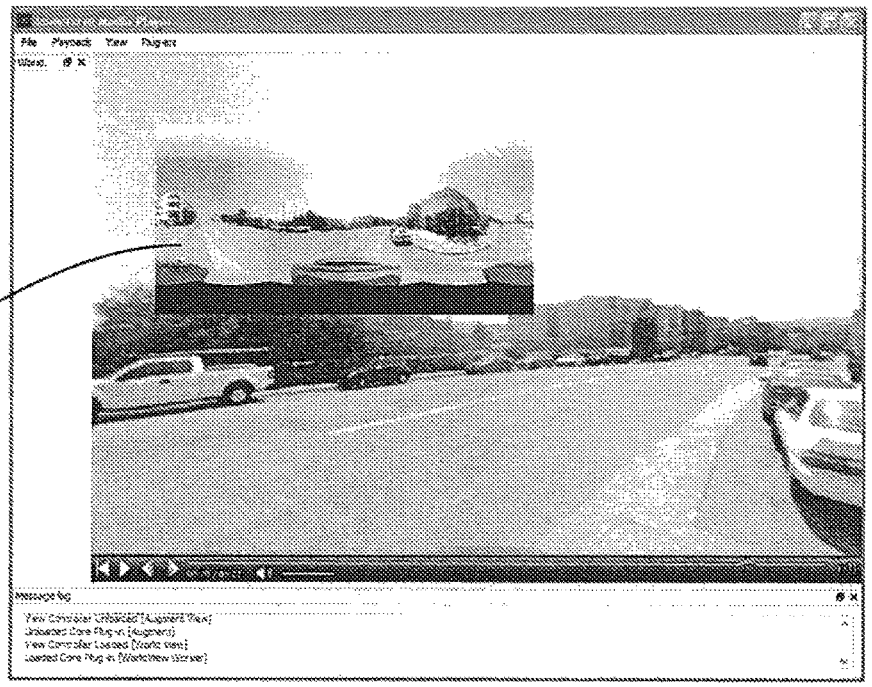
FIG. 18 shows an example user interface for the Worldview plug in service for the viewing application.

The Worldview plug in service shown in FIG. 18 provides the ability to display the otherwise invisible immersive image texture 156 in a reduced size, with options for scaling and transparency and for keeping the correct aspect ratio. The basic functions include overlay raw media texture, increase/decrease transparency, scale overlay, move overlay, tile texture horizontally, maintain correct aspect ratio. There is a C and Javascript interface.

The Remote Control plug in service allows for the control of the viewing application by means of a remote control device, including the ones used for control of conventional televisions and digital video recorders connected to broadband services, especially those with a computer interface that allows for broader interactivity through dynamic network delivery of media content and a dynamic display such as a ROI. The basic functions include assign keys list for activation of pointing the ROI, activation/deactivation of fullscreen mode, and display of menu options.

Figure 19:
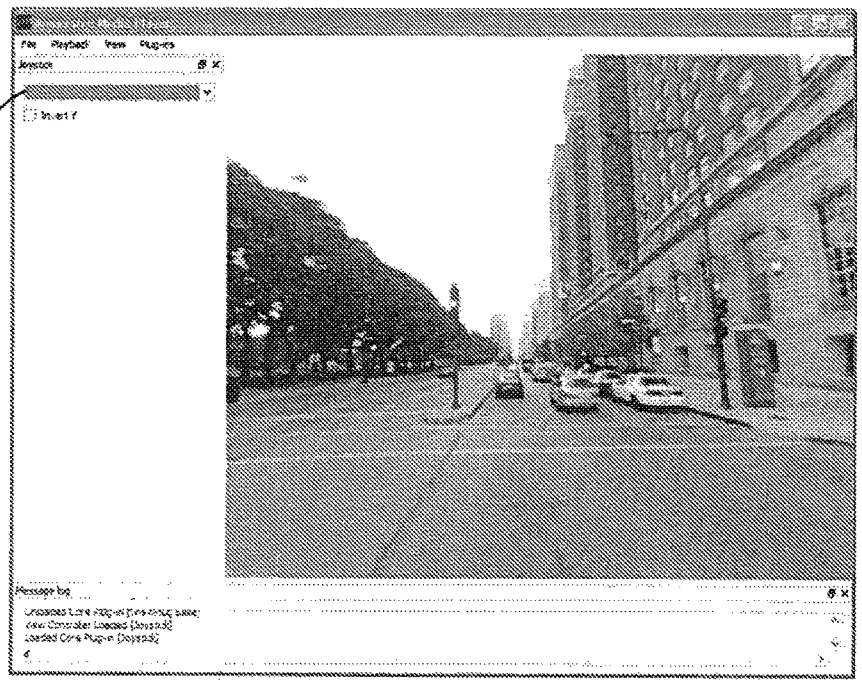
FIG. 19 shows an example user interface for the Joystick plug in service for the viewing application.

The Joystick plug in service shown in FIG. 19 allows for a pointing device such as a game controller's joystick 158 to control the field of view of the ROI. The basic functions assigning of the buttons and joysticks for Panning of the spherical scene, Toggle Pause/Play, Step Forward/Step Backward Slowly, Step Forward/Step Backward Quickly, Zoom In/Zoom Out, and Rewind to Beginning.

Figure 20:
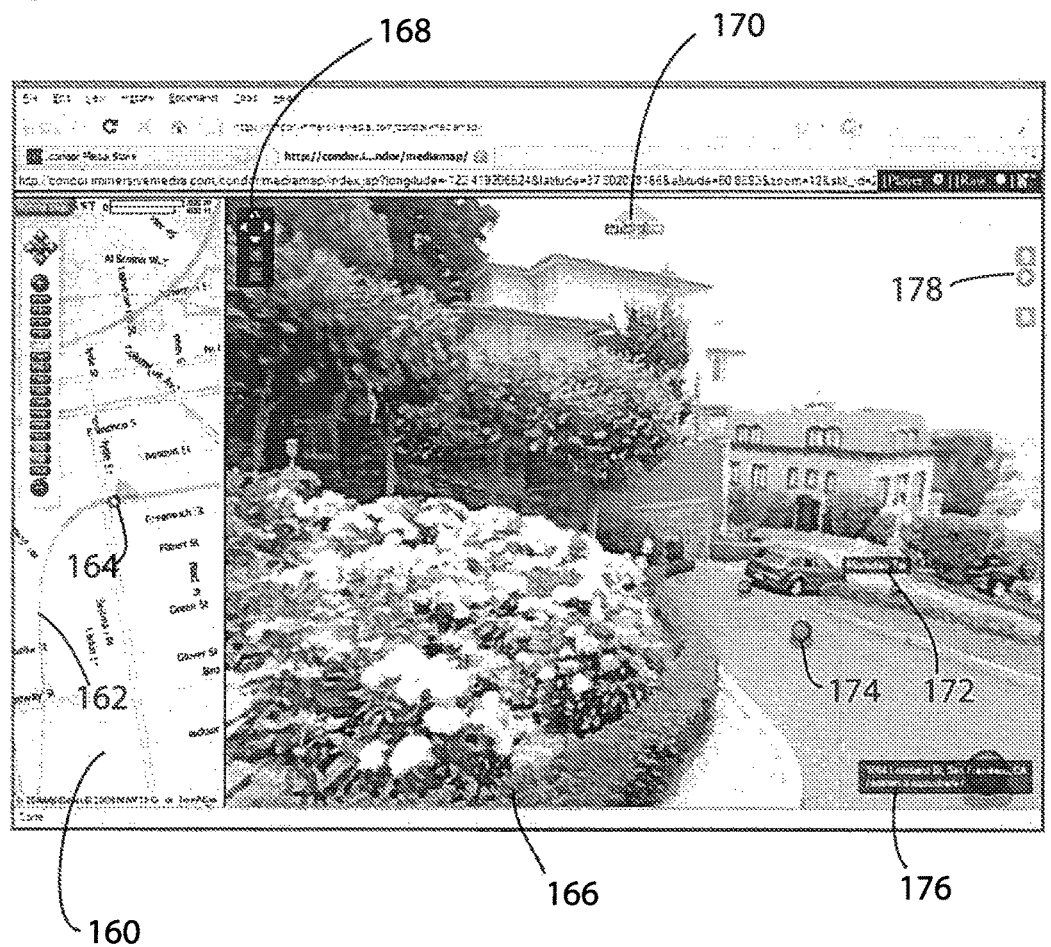
FIG. 20 shows the viewing application as part of a mapping system, featuring an immersive video display with overlays of a variety of information.

The accumulation of these capabilities for additional services represented by the plug ins enables the viewing application to be adaptable to meet a wide variety of display needs. For example, FIG. 20 shows a map application making use of the viewing application window in a browser. Here the viewing application is part of a metadata-rich environment of geographical information. The map 160 on the left comes from a mapping server, and has indications of the routes 162 taken by the immersive tracks that are available, and the location 164 on the track that is being displayed as a ROI within an immersive image in the view window 166 on the right. Superimposed objects on this view window include a navigation, zoom and direction indicator 168, a link 170 to an aerial recording of the same spot on the map, the name of a street 172 superimposed upon it, indicators such as at 174 of the locations of other immersive frames in the driving sequence, a notice 176 of the present address, and other playback controls 178.

Live Streaming

The viewing application can be used for the display of a live stream, including an immersive video stream, as part of a custom real-time online encoding and delivery media server system. The immersive live streaming web service, which Immersive Media Company calls IM LIVE™, is here described in detail as an example. It will be understood by those familiar with the art that the components described here are exemplary, and not restrictive.

The IM LIVE web service involves the viewing application being applied to real-time spherical immersive video, encoded and delivered in a convenient form such as Flash®. In a basic display view window for the viewing application, as shown within a browser window, the ROI window is 600×375 resolution, and represents a 105 degree wide field of view within a high quality Immersive Video stream. In addition, there is a Worldview window of 600×150 for observing and monitoring a entire 360 degree panoramic image. The total viewing application display of the ROI window and the Worldview combined is 600×525 pixels. An optional full screen viewing option can be chosen, for instance by right-clicking the viewing display and choosing this mode.

Figure 21:
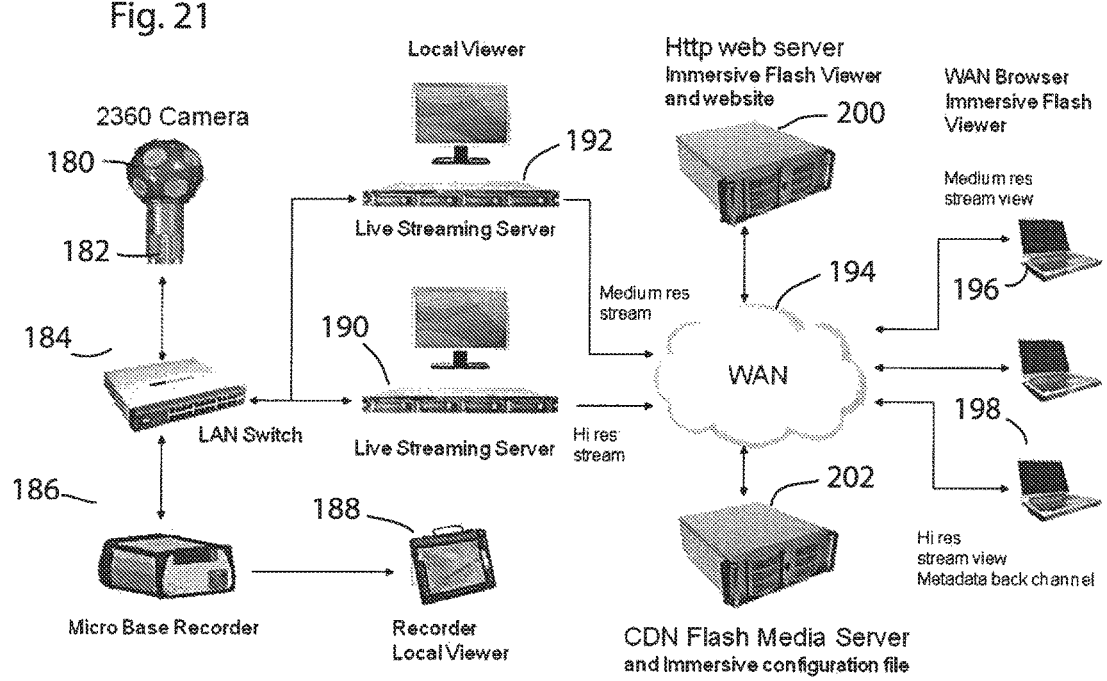
FIG. 21 shows the basic components of a live immersive streaming system.

As shown in the diagram of components in FIG. 21, the image from the immersive camera 180, preferably an uncompressed, lower-bandwidth stream 182 such as a raw Bayer pattern from the image sensors, goes through a switch 184, which sends one copy to a recorder 186 and a recorder local viewing 188, and the other to the live processing server. The Switch can be a simple Gigabit Ethernet Switch such as the 5 Port Linksys SLM2005, which is able to handle jumbo packets, and is non blocking. The server encodes and delivers the stream to the clients. Preferably, there is more than one quality level delivered, as shown in this case with two servers 190 and 192 encoding at different quality levels. Alternately, a variable resolution codec such as a wavelet transform can be used to delivered different levels of image quality out of one encoding pass.

The Micro Base Recorder 186, a miniaturized version of the earlier 2360 Base Unit recorder, has a proprietary processor which handles the eleven image channels from the Dodeca 2360 camera head at once. All of the channels are compressed using custom multi-channel MJPEG compression of 4:2:2 digital streams, and recorded in a synchronized, unified form. The recordings, in what is called the RDF format, can incorporate GPS or other metadata from external devices through USB or serial ports in the recorder. Two independent monitor views from the image stream information are available in both NTSC composite and S-Video. Total weight is about 5 lbs.

The Local Viewer 188 for the Recorder can be a small PC or tablet such as the Lenovo X200 ThinkPad Tablet PC for local viewing, control, and configuring of the Dodeca 2360 Camera. and Micro Base Recorder. It has a 12.1" widescreen WXGA (1200×800) LED backlit finger and digitizer pen touch display, and a Gigabit Ethernet connection to the Micro Base Recorder. The Intel® Core™2 Duo processor SL9400 (1.86 GHz, 6 MB L2, 1066 MHz FSB) processor runs an Immersive Media application for image display and camera and recorder control, with an easy to read Dashboard Display of system status, as well as a stitched Worldview preview display of the Dodeca 2360 camera image at 1200×600 resolution at 10 fps, or a single camera view of 640×480 at 15 fps. The weight is about 4 lbs and the battery life is more than 8 hours.

The Streaming Encoding Server 190, 192 can be a workstation such as the HP DL360 ProLiant or its equivalent. The server software includes Windows 2003 Server Enterprise Edition Service Pack 2, with the Immersive Media live streaming application. The encoding uses Adobe Flash Media Live Encoding 2.5, with the Main Concept AAC audio Encoder, and optional Flash Media Interactive Server 3. The server hardware includes Dual Quad Core Intel Xeon (2.9 GHz) processors, a dual 1 Gigabit Ethernet PCIe Server Adapter Intel Pro 1000PT, eight 1 GB PC2-5300 memory, and Creative Labs Sound Blaster X-Fi xtreme audio PCIe. The dimensions are 1.7×17.64×26.86 in and the weight is approximately 37 lbs.

In each server, the image information is stitched into a continuous image, as is described in FIG. 25, and divided into two halves of a panoramic strip, which are stacked to better make use of the buffer structure of the codec. The compressed image stream from the codec is then presented as a streaming feed into a wide area network 194, and received by one or more client viewing application subscribing to the feed, as detailed in FIG. 26. Here at least one of the clients 196 is viewing the medium resolution feed, and another is viewing the high resolution feed 198. The viewing application can also receive other media such as from an http web server or other web server 200 such as a Windows Media Server, or a Content Delivery Network Flash (CDN) Media Server 202, which can also supply an Immersive Media configuration file to adapt the viewing application to display and interpret the media. The CDN used should be scalable for variable loads, such as Limelight Network. Other encoding methods for movies than Flash could be used within the same architecture, such as Silverlight, MPEG-7, MPEG 21, for display within the viewing application.

The Distribution network uses Flash Media Interactive Server 3 or greater, with an Immersive Media Configuration File. While the live image is streaming, the raw camera stream or encoded Flash stream can also be recorded for later playback. Up to 8 hours of Immersive Video can be archived with the camera's Micro Base Recorder 186.

Figure 22:
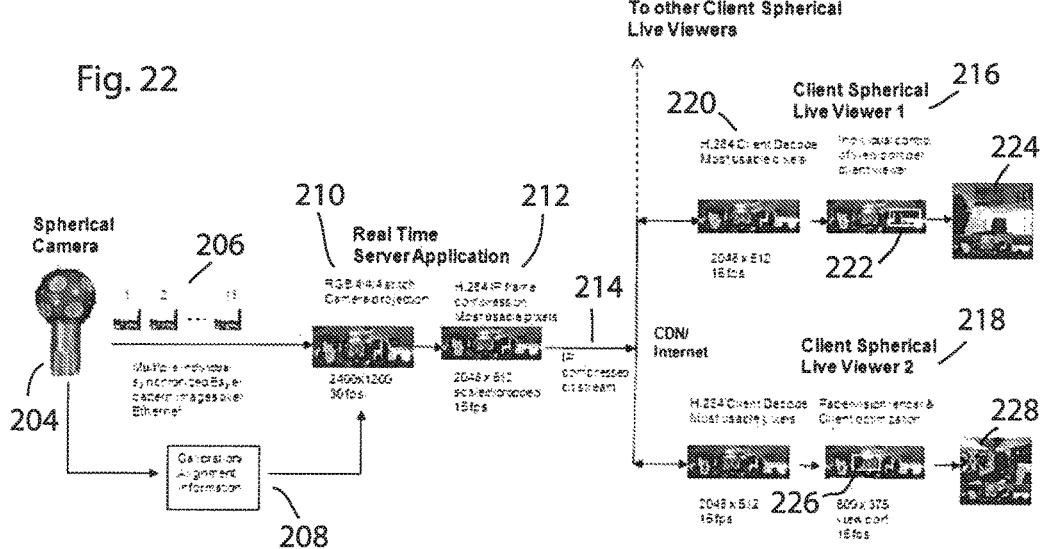
FIG. 22 a layout of the components of the immersive streaming server and client.

FIG. 22 is an overview of the server-client system for live immersive streaming. An immersive camera, such as the Dodeca® 2360 Telemmersion® camera system is shown at 204. This camera captures a spherical video image using a dodecahedron geometry of eleven synchronized VGA Bayer pattern sensors, with the sensor data 206 streamed via Gigabit Ethernet to either the camera's Event Archive Recorder, such as the Micro Base Recorder, or the Streaming Media Processor, or both. Other cameras with a wide field of view can also be used to feed this system; most immersive cameras involve multiple sensors which must be stitched and formatted in the image server in a similar manner to what is described here according to calibration/alignment information 208 which describes the construction alignment of the individual camera's optical elements. The real time server application first stitches together the immersive camera information into a full-sphere image 210, and then can optionally trim the top and bottom to a smaller size 212, as well as reduce the frame speed, in order to save bandwidth. The IP compressed stream 214 is then transmitted. The reception of the stream is shown with two example clients 216 and 218, both of whom use the viewing application. The first stage for each client is the decompressing and unpacking of the image 220, followed by the extraction of an individual ROI or view port 222, which is then displayed 224. The second client's extraction of the ROI 226 is completely independent of the first client; all that they share is a subscription to the same media feed. The second ROI can be processed and displayed in a different manner in the second client's viewing application, such as by the use of local rendering resources such as Papervision, image enhancement, or use of hotspots or overlays that are particular to the second client's display 228 in the viewing application.

Figure 23:
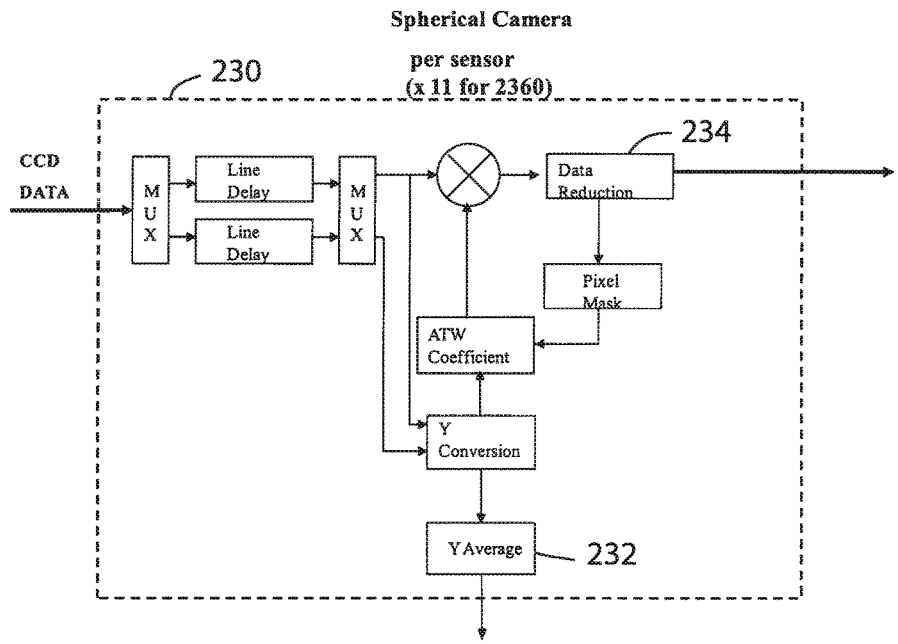
FIG. 23 is a block diagram of the first stage of data processing within the immersive camera.
Figure 24:
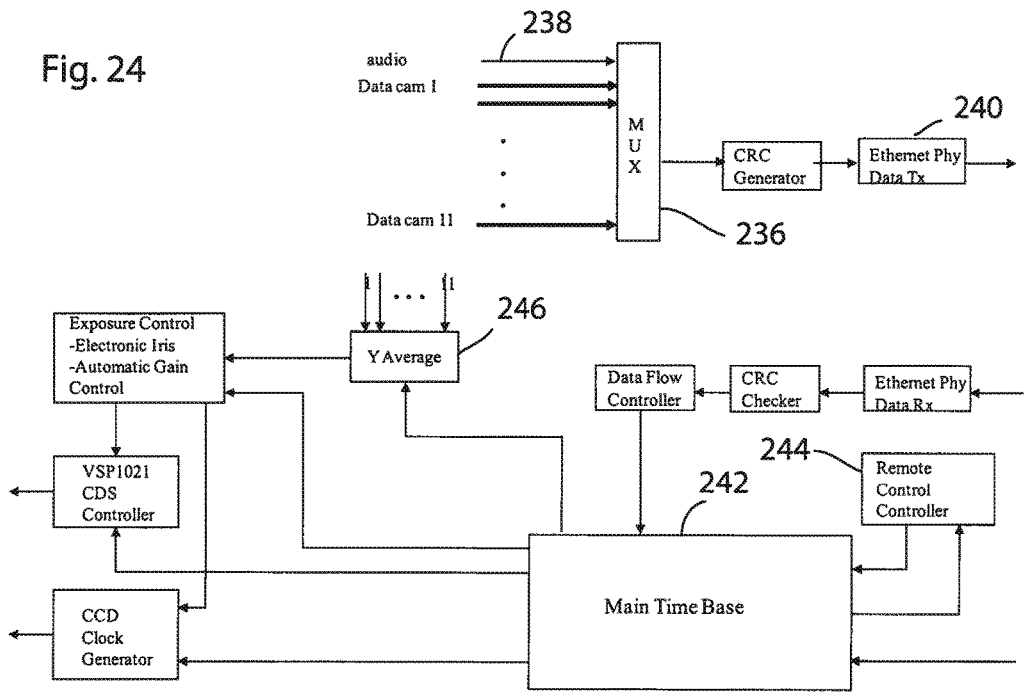
FIG. 24 is a block diagram of the second stage of data processing within the immersive camera.

FIG. 23 and FIG. 24 shows more detail of the construction of the immersive camera. The Dodeca® 2360 Camera Head has eleven CCD ⅓" sensors in a modular dodecahedral array, with unified timing and control and custom image enhancement. The field of view of the full array is 360° horizontal, 290° vertical (91.7% of a spherical field of view), and each lens accepts standard filters and lens hoods. Total weight for the camera head is about 2 lbs. The horizontal resolution per channel is more than 450 lines, with 640×480 square pixels per channel. FIG. 23 shows the data processing for each sensor 230, with a larger bit depth sample used for exposure tracking and color matching among the camera images, using a Y or luminance average 232, along with an intelligent data reduction a smaller number of bits 234.

FIG. 24 shows the multiplexed combination of the camera streams 236, including audio 238 from four directional microphones, for transmission along the physical layer of a Gigabit Cat 5E cable cable 240 to the micro base recorder and the streaming server. The cable to the micro base recorder also carries extra lines from the micro base recorder to power the camera head, and also carries back timing information 242 and camera control signals 244. The Y averages from the sensors 246 are used to do color and exposure balancing and tracking for a wide range of lighting conditions.

FIG. 25 shows how the digital sensor readings from the camera are processed in a server to make the final streaming video result. A synchronized audio input is provided by external balanced audio stereo line level inputs or the embedded microphones in the camera head. The streamed AAC stereo audio channels are synchronized to the video by the application of a delay to compensate for the latency of the video encoding. This server can be an external workstation, or custom embedded hardware and firmware in the camera itself. The processing steps in the server include a Manual Adjustment of Parallax, a high quality Laplacian demosaic of the Bayer pattern to make the pixels, Automatic Anti-Vignetting to compensate for differences in illumination within each camera's image, Automatic Sensor Luminance Balance detection based on camera image overlap zones with auto-correction, to balance the color and exposure of the different cameras and match the objects in view by both lenses, a Blending Mode Algorithm based on Image Alignment measurement and Sensor Balance, producing a single blended immersive image from the separate sensor inputs. A motion picture is made of a continuous stream of these images, which are either recorded in an uncompressed form or compressed to a greater or lesser degree depending on the intended use and the available distribution bandwidth. Several simultaneous encodings of the continuously streaming immersive video can be done, for example a Flash H.264 audio/video encode of a high quality equirectangular image at 30 frames/sec at a 4 mbps-5 mbps compressed target bit rate, and also a Flash H.264 audio/video encode medium quality equirectangular image at 15 frames/sec at 750 Kbs-1 Mbs compressed target bit rate. This stream can be saved by itself, or optionally a MJPEG compressed 4:2:2 video of the sensor data, in blended or unblended form, can be saved as an archival record of the live event.

FIG. 26 shows the components of the client viewing application, including decompression and unpacking of the panoramic image, the extraction of a view port or ROI, and the synchronization of audio, leading to a viewing application display. The client playback can use Adobe Flash Player 9 or greater, with the IM Player viewing application with the Flash plug in service being loaded, in a manner transparent to the user, from an http web server.

Figure 27:
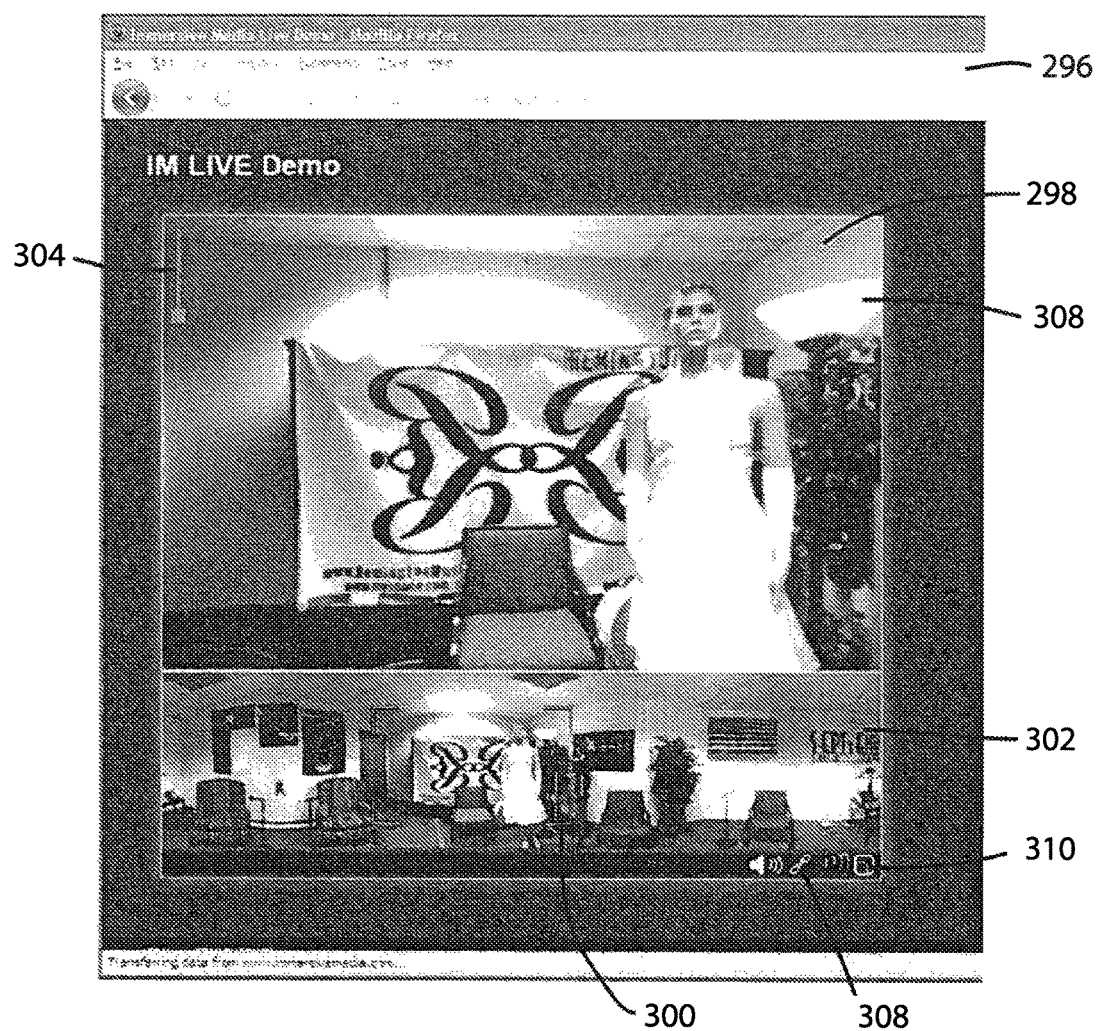
FIG. 27 shows the client viewing application in a browser window.

In FIG. 27 the viewing application display appears in the browser window, showing a region of interest within the immersive panoramic strip shown on the bottom. The location of the ROI can be shown by corners, border, a crosshair, or any other indicators.

Figure 28:
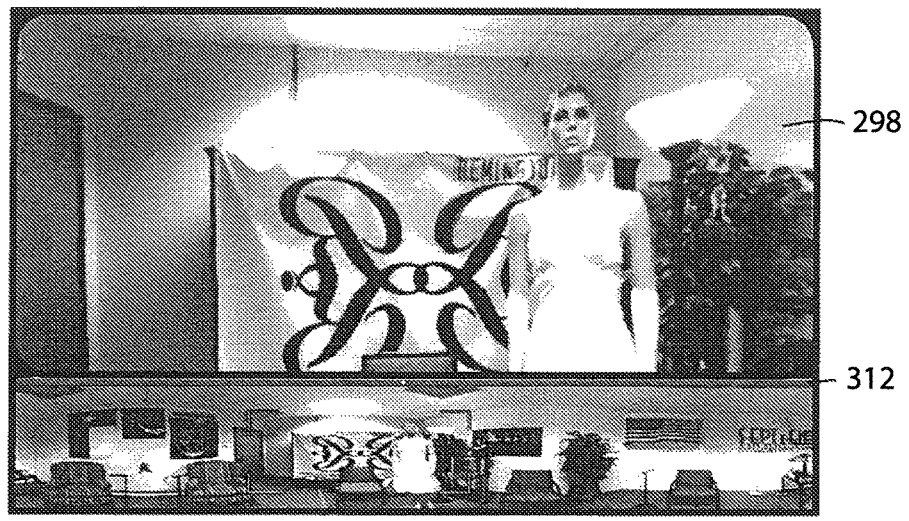
FIG. 28 is an example of the viewing application display in fullscreen mode, with the panoramic display along the bottom.
Figure 29:
FIG. 29 is an example of the viewing application display in fullscreen mode, without the panoramic display.

FIG. 28 shows a full screen mode display, in which the browser and desktop disappears. This full-screen mode is available by a user selection, such as a keystroke or a right-click and selection within the viewing application window. A click on the dividing line or another keystroke command lowers the immersive panoramic strip out of the way, so that only the ROI fills the screen as is shown in FIG. 29. Another click or keyboard commend can bring the immersive panoramic strip back, or return the user to the browser interface as shown in FIG. 27.

The viewing application represents a media playback solution that is able to present both live and prerecorded content, in both immersive and non-immersive form, either along or in combination with metadata that enhance the user experience.

The example presented here represents a successful deployment of this viewing application using current standards for hardware and software. As the natural progress of these standards continues, it is anticipated that the described viewing application will be able to deliver enhanced realism and functionality with fewer unnecessary technological restrictions.

While the embodiments of the present invention have been particularly shown and described above, it will be understood by one of ordinary skill in the art that various changes in form and details may be made therein without departing from the spirit and scope of the present invention as defined by the following claims.

What is claimed is:

1. A system for the display of media and associated metadata, comprising:
   network resources including:
      at least one media server having:
         a computing platform; and
         storage for storing immersive image media, region of interest subdivisions of the immersive image media and identification information for said immersive image media and its associated region of interest subdivisions;
         wherein the at least one media server is operable to deliver the immersive image media or a region of interest subdivision upon a request from a client according to its identification information;
      at least one metadata server having:
         a computing platform; and
         storage for storing a plurality of metadata associated with the immersive image media or the region of interest subdivisions of the immersive image media and identification information for said metadata;
         wherein the at least one metadata server is operable to deliver the metadata upon a request from a client according to its identification information;
      a client including:
         a computing platform having:
            a memory storing a client viewing application, the client viewing application having machine-readable instructions that, when executed by the computing platform, cause the client to provide:
               a user interface service for generating requests for specific network resources, including the identification information for the requested network resources, and for communicating to the servers representing the requested network resources;
               a data management service for receiving data comprising requested immersive image media and requested metadata or a requested region of interest subdivision of the requested immersive image media and requested metadata from the servers, including identification information, and for storing the received data in the memory;
               a data formatting service for identifying a source formatting of the received data and for formatting the received data;
               an application display service for presenting data formatted by the data formatting service on a display, including presenting, on the display, the requested region of interest; and
               a playback control service for controlling a speed and a direction of movement of the requested region of interest within the immersive image media presented on the display by the application display service according to user input, the movement of the requested region of interest comprising spatial movement of the region of interest from a first user-selected spatial portion of the immersive image media to a second user-selected spatial portion of the immersive image media;
            wherein the application display service also presents, on the display, at least one of:
               (i) the requested metadata; and
               (ii) the requested immersive image media and the requested metadata.

2. The system of claim 1, wherein the requested image media comprises immersive video media comprising an image sequence and associated audio data.

3. The system of claim 1, wherein the data formatting service spatially rearranges the received data.

4. The system of claim 1 wherein the playback control service provides for movement of the requested region of interest within the requested immersive image media on the display solely by movement of a cursor within the display.

5. The system of claim 1 wherein the application display service is operable to present, on the display, one of: the requested region of interest and the requested metadata; and the requested region of interest, the requested immersive image media and the requested metadata, according to the source formatting of the received data.

6. The system of claim 5 wherein the application display service is operable to present an indication of when the application display service is presenting the requested region of interest and the requested metadata.

7. The system of claim 5 wherein the presented image fills the available area of the display.

8. The system of claim 1 wherein the application display service includes indicators of other media which can be selected for display by said user interface.

9. The system of claim 1 wherein the application display service includes the capability of adding plug in services.

10. The system of claim 1 wherein the display comprises a head mounted display, wherein the client viewing application further has machine-readable instructions that cause the client to provide a head tracker service for controlling the direction of a region of interest window and displaying the region of interest window as a separate window in the head mounted display.

11. The system of claim 1 wherein the application display service presents, on the display, an overlay of metadata representing the identification information stored on the media server.

12. The system of claim 1 wherein the application display service copies and stores the requested region of interest and the requested metadata.

13. The system of claim 1 wherein the application display service includes an ability to present additional images, meshes and text on the display according to latitude and longitude coordinates.

14. The system of claim 13 wherein geospatial information is derived from the appearance of pixels along projected rays as seen from successive video frames.

15. The system of claim 5 wherein the application display service includes an ability to stabilize the requested region of interest according to camera pose information.

16. The system of claim 15 wherein the camera pose information is derived from visual analysis of objects in view over successive video frames.

17. The system of claim 5 wherein the application display service includes an ability to record and play back a path taken by a manually controlled region of interest over time as a view track, and to select from among multiple stored view tracks to automatically control the movement of a region of interest window.

18. The system of claim 1 wherein the at least one media server is a live streaming immersive video server.

19. The system of claim 5 wherein the application display service presents the requested region of interest and a vertically cropped worldview image of the requested immersive image media, with the worldview image having an indication of the location of the region of interest window being displayed.

20. A method for the display of media and associated metadata, comprising:
storing and reading machine-readable instructions for a client viewing application which includes a user interface service, a data management service, a data formatting service, an application display service, and a playback control service;
using the user interface service to generate requests for specific network resources according to identification information for the requested network resources, and to communicate to the servers representing the requested network resources;
using the data management service to receive data comprising requested immersive image media and requested metadata or a requested region of interest subdivision of the requested immersive image media and requested metadata from the servers, including the identification information, and to store the received data in a memory;
using the data formatting service to format the received data according to its source formatting;
using the application display service to present data formatted by the data formatting service on a display including presenting, on the display, the requested region of interest; and
using the playback control service to control a speed and a direction of movement of the requested region of interest presented on the display by the application display service according to user input, the movement of the requested region of interest comprising spatial movement of the region of interest from a first user-selected spatial portion of the immersive image media to a second user-selected spatial portion of the immersive image media;
wherein the application display service also presents, on the display, at least one of:
(i) the requested metadata; and
(ii) the requested immersive image media and the requested metadata.

21. A tangible article of machine-readable storage media having machine-readable instructions for a computing platform stored thereon, the storage medium selected from the group consisting of magnetic storage, optical storage, quantum storage, and phase change storage, said machine-readable instructions, when executed by the computing platform, results in the computing platform performing the method recited in claim 20.

22. A system for a client including:
a storage medium for the storage of machine-readable instructions for a computing platform, the storage medium selected from the group consisting of magnetic storage, optical storage, quantum storage, and phase change storage, said machine-readable instructions, when executed by the computing platform, cause the client to provide:
a user interface service for generating requests for specific network resources, including the identification information for the requested network resources, and for communicating to the servers representing the requested network resources;
a data management service for receiving data comprising requested immersive image media and requested metadata or a requested region of interest subdivision of the requested immersive image media and requested metadata from the servers, including identification information, and for storing the received data in a memory of the computing platform;
a data formatting service for identifying a source formatting of the received data and for formatting the received data;
an application display service for presenting data formatted by the data formatting service on a display, including presenting, on the display, the requested region of interest; and
a playback control service for controlling a speed and a direction of movement of the requested region of interest within the immersive image media presented on the display by the application display service according to user input, the movement of the requested region of interest comprising spatial movement of the region of interest from a first user-selected spatial portion of the immersive image media to a second user-selected spatial portion of the immersive image media;
wherein the application display service also presents, on the display, at least one of:
(i) the requested metadata; and
(ii) the requested immersive image media and the requested metadata.

* * * * *